Figure 1:
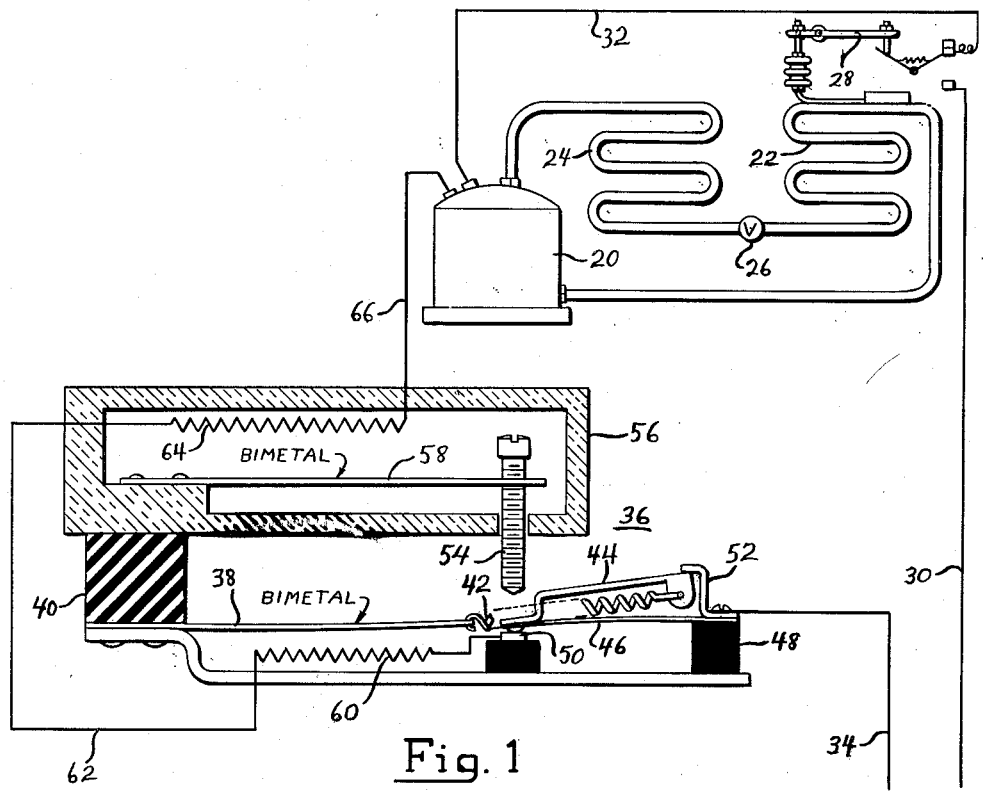

Sept. 30, 1952     D. F. ALEXANDER     2,612,543
ELECTRICAL APPARATUS
Filed Dec. 11, 1946

INVENTOR.
Donald F. Alexander
BY
Spencer Hardman and Fehr
attorneys

Patented Sept. 30, 1952

2,612,543

UNITED STATES PATENT OFFICE 2,612,543

ELECTRICAL APPARATUS

Donald F. Alexander, Oakwood, Ohio, assignor to General Motors Corporation, Dayton, Ohio, a corporation of Delaware Application December 11, 1946, Serial No. 715,379

2 Claims. (Cl. 175—294)

This invention relates to electrical apparatus and more particularly to overload protectors for electric motors.

When self-resetting motor overload protectors are employed, it is customary to set the protector to trip at a sufficiently low current flow to protect properly the motor windings for one or several resettings of the protector, and yet high enough to permit a generous amount of continuous motor overload. Should motor stalling conditions or excessive overloads continue for extended periods of time the protector will trip and reset repeatedly. Upon each resetting, the flow of current is abnormally high. The customary setting permits successive flow of current upon such resettings to increase cumulatively the temperatures of the windings so that eventually the temperatures become high enough to endanger the insulation.

It is an object of my invention to provide an overload protector in which the heating of the motor and the consequent winding temperature are reduced as the protector continues to trip.

It is another object of my invention to provide an overload protector in which the open period of the protector contacts is increased as the motor stalling or overload conditions continue.

It is another object of my invention to provide a very simple arrangement for reducing the proportion of closed time to open time of such protector contacts as the stalling or overload conditions continue.

These objects are attained by providing a movable thermally controlled reset stop for the overload protector which is heated by the flow of motor current, so that under severe overload or motor stalling conditions the resetting stop will be retracted to prolong the open-circuit time of the protector contacts.

Further objects and advantages of the present invention will be apparent from the following description, reference being had to the accompanying drawing, wherein a preferred form of the present invention is clearly shown.

Figure 2:
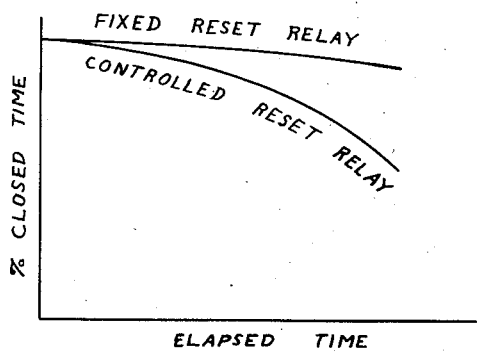

In the drawing:

Fig. 1 is a diagrammatic view of a refrigerating system and overload protector embodying one form of my invention; and Fig. 2 is a graph indicating the effect of my controlled reset relay in contrast to the conventional fixed reset relay.

I have chosen to show my overload protector as applied to a refrigerating system of the sealed unit type since this is one motor application in which prolonged stalling conditions are encountered. Shown in Fig. 1 is a sealed motor-compressor unit 20 for withdrawing evaporated refrigerant from the evaporator 22 and for forwarding the compressed refrigerant to the condenser 24 where the compressed refrigerant is liquefied and flows under the control of a suitable expansion valve 26 to the evaporator 22. The operation of the refrigerating system is normally controlled by a thermostatic switch means 28 responsive to the temperature of the evaporator 22. It is connected in series with the supply conductor 30 and is connected by the conductors 32 with the windings of the electric motor within the sealed motor-compressor 20.

Connected to the other supply conductor 34 is the overload protector 36 embodying one form of my invention. This overload protector 36 includes the actuating bimetal 38 supported at one end upon the insulating block 40 and having its free end connected by the tension toggle spring 42 to a toggle snap-acting mechanism which includes the rigid arm 44 and a flexible tension strip 46 anchored at one end to the insulating block 48 and riveted at its opposite end by the movable contact to the rigid arm 44. The movable contact is normally held in engagement with the stationary contact 50 when the actuating bimetal 38 is cool. The rigid arm 44 is stopped in one direction by the stop 52 and in the opposite direction by the strip 46.

The resetting of the overload is controlled by the position of the reset stop screw 54 which limits the opening movement of the movable contact. This screw 54 protrudes through an aperture in the heat insulating enclosure 56 which contains a cantilever bimetal 58 through the free end of which is threaded the reset screw 54. The actuating bimetal 38 is heated by an electric heater 60 connected at one end to the stationary contact 50 and at the other end to the conductor 62 which connects to a second electric heater 64 located within the heat insulated enclosure 56. The other end of the electric heater 64 is connected by the conductor 66 to the motor within the sealed unit 20. The flexible strip 46 serves to conduct the current from the supply conductor 34 to the movable contact.

According to this arrangement when the motor operates properly, the overload protector will not trip to the open position until an amount of current endangering the motor windings flows through the electric heater to heat the bimetal 38 and cause it to flex upwardly to operate the snap-acting mechanism so that the movable contact moves upward to a limit determined by the reset stop. This deenergizes the entire circuit so that the bimetal 38 gradually cools and when a certain minimum temperature is reached the overload protector will reclose and re-energize the circuit.

The starting period of the motor ordinarily is comparatively short but a comparatively high amount of current passes through the circuit at this time. The relative proportion of the starting current to the running current varies according to the size and type motor used. This proportion may vary from as little as 4 to 1 to as much as 15 to 1. The heating effect of the current, however, is in proportion to the square of the current value. Thus the heating effect per unit of time may vary from 16 to 225 times the heating effect at normal current flow. During normal cycling, this heating effect of the motor starting current is sufficiently short and occurs at such widely spaced intervals that its effect upon the bimetals 38 and 58 is negligible. However, under motor stalling conditions this abnormally high current is prolonged and is repeated at sufficiently frequent intervals that it does have an appreciable effect and may heat up the windings sufficiently to damage them.

However, according to my invention this heating effect is used also to heat the bimetal 58 to cause it to move the resetting screw 54 away from the stationary contact so that the open circuit periods of the protector under these conditions grow longer as the stall or overload condition continues. As is shown in the graph in Fig. 2, the percent of closed-contact time decreases more and more rapidly as the elapsed time of the stall or overload condition continues. When the resetting stop screw, such as screw 54, is fixed, the percent of closed time remains substantially the same as indicated by the line on Fig. 2 labeled "fixed reset relay." The heat insulated enclosure 56 prevents the rapid dissipation of the heat generated by this auxiliary electric heater 64 so that the interior becomes warmer as the stall conditions continue. If desired, however, the heat insulated enclosure 56 may be omitted, but in such a situation the reduction in the percentage of closed time will not be as pronounced. Also in such a case the electric heater should be placed in better heat-exchange relationship with the bimetal 58. The effect can be varied by varying the proportions of the bimetal and the electric heater as well as the insulated enclosure 56 to obtain the characteristics desired.

While the form of embodiment of the invention as herein disclosed, constitutes a preferred form, it is to be understood that other forms might be adopted, as may come within the scope of the claims which follow.

What is claimed is as follows:

1. In combination, an electric motor, a plurality of supply conductors for supplying electric energy to said motor, a self-resetting overload protector having a set of protector contacts connected in series with one of said supply conductors for deenergizing said electric motor, said overload protector including a stop for determining its reclosing setting, a thermal means for moving the stop, and a heating means connected in a direct single conductor series arrangement with one of said supply conductors and in series with said protector contacts and said motor and located in direct intimate heat exchange relationship with said thermal means for heating said thermal means throughout each operating period of the motor.

2. In combination, an electric motor, a plurality of supply conductors for supplying electric energy to said motor, a self-resetting overload protector having a set of protector contacts connected in series with one of said supply conductors for deenergizing said electric motor, said overload protector including a stop for determining its reclosing setting, a thermal means for moving the stop, a heating means connected in a direct single conductor series arrangement with one of said supply conductors and in series with said protector contacts and said motor and located in direct intimate heat exchange relationship with said thermal means for heating said thermal means throughout each operating period of the motor, and separate enclosing means separate from the remainder of the overload protector for enclosing said thermal means and said heating means within a common chamber and excluding the remainder of the overload protector for shielding the thermal means from the remainder of the overload protector.

DONALD F. ALEXANDER.

REFERENCES CITED

The following references are of record in the file of this patent:

UNITED STATES PATENTS

| Number | Name | Date |
|---|---|---|
| 2,306,810 | Jones | Dec. 29, 1942 |
| 2,374,967 | Alexander | May 1, 1945 |
| 2,412,981 | Harrold | Dec. 24, 1946 |